(12) United States Patent
Lohmar et al.

(10) Patent No.: US 12,096,269 B2
(45) Date of Patent: Sep. 17, 2024

(54) APPLICATION CONTROL OF PROVIDING APPLICATION DATA TO RADIO LINK

(71) Applicant: Telefonaktiebolaget LM Ericsson (publ), Stockholm (SE)

(72) Inventors: Thorsten Lohmar, Aachen (DE); Robert Skog, Hässelby (SE); Zaheduzzaman Sarker, Järfälla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 79 days.

(21) Appl. No.: 17/621,299

(22) PCT Filed: Jun. 26, 2019

(86) PCT No.: PCT/EP2019/067090
§ 371 (c)(1),
(2) Date: Dec. 21, 2021

(87) PCT Pub. No.: WO2020/259834
PCT Pub. Date: Dec. 30, 2020

(65) Prior Publication Data
US 2022/0361034 A1    Nov. 10, 2022

(51) Int. Cl.
*H04W 28/02* (2009.01)
*H04L 67/00* (2022.01)
(Continued)

(52) U.S. Cl.
CPC ......... *H04W 28/0236* (2013.01); *H04L 67/00* (2013.01); *H04W 4/20* (2013.01); *H04W 28/12* (2013.01); *H04W 72/20* (2023.01)

(58) Field of Classification Search
CPC . H04W 28/00; H04W 28/02; H04W 28/0231; H04W 28/0236; H04W 28/0284;
(Continued)

(56) References Cited

U.S. PATENT DOCUMENTS 8,946,549 B2 * 2/2015 Picard ................ H01B 9/028
174/102 R
2011/0275364 A1 * 11/2011 Austin .................. H04L 41/06
455/423

(Continued)

FOREIGN PATENT DOCUMENTS

WO  2009024188 A1   2/2009
WO  2016209421 A1  12/2016
(Continued)

OTHER PUBLICATIONS

International Search Report and Written Opinion of the International Searching Authority for PCT International Application No. PCT/EP2019/067090 dated Mar. 4, 2020.

(Continued)

*Primary Examiner* — Warner Wong
(74) *Attorney, Agent, or Firm* — Weisberg I.P. Law, P.A.

(57) ABSTRACT

The application data is transmitted via a radio link between a radio device Q and the wireless communication network. The application data are provided by one or more applications. A node of the wireless communication network provide control information, which is provided to at least one of the applications. The control information controls providing of the application data by the at least one application to the radio link.

16 Claims, 8 Drawing Sheets

(51) Int. Cl.
  *H04W 4/20* (2018.01)
  *H04W 28/12* (2009.01)
  *H04W 72/20* (2023.01)

(58) Field of Classification Search
  CPC . H04W 28/0289; H04W 28/10; H04W 28/12; H04W 8/00; H04W 72/00; H04W 72/20; H04W 4/20; H04W 80/08; H04W 72/12; H04L 43/00; H04L 41/34; H04L 67/00
  See application file for complete search history.

(56) References Cited

U.S. PATENT DOCUMENTS

| | | | |
|---|---|---|---|
| 2013/0121147 A1 | 5/2013 | Tapia et al. | |
| 2013/0272251 A1* | 10/2013 | Schmidt | H04W 72/12 370/329 |
| 2014/0133293 A1* | 5/2014 | Ismail | H04W 28/0289 370/229 |
| 2014/0237117 A1 | 8/2014 | Cha | |
| 2015/0016247 A1* | 1/2015 | Hayes | H04L 47/127 370/230 |
| 2016/0134464 A1* | 5/2016 | Centonza | H04W 28/0247 370/236 |
| 2019/0364405 A1* | 11/2019 | Busropan | H04L 67/02 |
| 2020/0213371 A1* | 7/2020 | Szucs | H04N 21/23439 |
| 2021/0084528 A1* | 3/2021 | Kim | H04W 28/0289 |
| 2022/0029751 A1* | 1/2022 | Cai | H04W 72/20 |
| 2022/0150754 A1* | 5/2022 | Perras | H04W 28/0289 |

FOREIGN PATENT DOCUMENTS

| | | |
|---|---|---|
| WO | 2017076463 A1 | 5/2017 |
| WO | 2019070353 A1 | 4/2019 |

OTHER PUBLICATIONS

3GPP TR 26.939 V16.0.0, "3rd Generation Partnership Project; Technical Specification Group Services and System Aspects; Guidelines on the Framework for Live Uplink Streaming (FLUS); (Release 16)," Jun. 2019, 55 pages.

3GPP TS 26.501 V16.0.0, "3rd Generation Partnership Project; Technical Specification Group Services and System Aspects; 5G Media Streaming (5GMS); General description and architecture (Release 16)," Jun. 2019, 30 pages.

* cited by examiner

APPLICATION CONTROL OF PROVIDING APPLICATION DATA TO RADIO LINK

CROSS REFERENCE TO RELATED APPLICATION

This application is a 35 U.S.C. § 371 national stage application of PCT International Application No. PCT/EP2019/067090 filed on Jun. 26, 2019, the disclosure and content of which is incorporated by reference herein in its entirety.

TECHNICAL FIELD

The present invention relates to methods for controlling data traffic and to corresponding devices, nodes, systems, and computer programs.

BACKGROUND

The amount data traffic in wireless communication networks is increasing. A part of the data traffic is generated by various applications executed on mobile communication devices (also referred to as UEs). One way to address the increased amount of data traffic is by adding more and more network capacity, e.g., in terms of additional cells and/or frequencies. However, this may involve significant costs, and additional frequency resources are scarce.

Insufficient capacity of a wireless communication network may in turn result in congestions. For dealing with such congestions, is to provide a congestion control mechanism. Such congestion control mechanism may for example operate on a transport layer and act by delaying or dropping data packets. However, existing mechanisms do not allow for coordinating application data traffic in view of a more efficient utilization of existing resources.

Accordingly, there is a need for techniques which allow for efficiently controlling data traffic in a wireless communication network.

SUMMARY

According to an embodiment, a method of controlling data traffic between a radio device and a wireless communication network is provided. The method comprises transmitting application data via a radio link between the radio device and the wireless communication network. The application data are provided by one or more applications. The radio device receives control information provided by a node of the wireless communication network. Further, the radio device provides the received control information to at least one of the applications. The control information controls providing of the application data by the at least one application to the radio link.

According to a further embodiment, a method of controlling data traffic between a radio device and a wireless communication network is provided. According to the method a node of the wireless communication network provides control information to at least one application. The at least one application provides application data to a radio link between the radio device and the wireless communication network. The control information controls providing of the application data by the at least one application to the radio link.

According to a further embodiment, a radio device is provided. The radio device is configured to transmit application data via a radio link between the radio device and the wireless communication network. The application data are provided by one or more applications. Further, the radio device is configured to receive control information provided by a node of the wireless communication network. Further, the radio device is configured to provide the control information to at least one of the applications. The control information controls providing of the application data by the at least one application to the radio link.

According to a further embodiment, a radio device is provided. The radio device comprises at least one processor and a memory. The memory contains instructions executable by said at least one processor, whereby the radio device is operative to transmit application data via a radio link between the radio device and the wireless communication network. The application data are provided by one or more applications. Further, the memory contains instructions executable by said at least one processor, whereby the radio device is operative to receive control information provided by a node of the wireless communication network. Further, the memory contains instructions executable by said at least one processor, whereby the radio device is operative to provide the control information to at least one of the applications. The control information controls providing of the application data by the at least one application to the radio link.

According to a further embodiment, a node for a wireless communication network is provided. The node is configured to provide control information to at least one application. The at least one application provides application data to a radio link between the radio device and the wireless communication network. The control information controls providing of the application data by the at least one application to the radio link.

According to a further embodiment, a node for a wireless communication network is provided. The node comprises at least one processor and a memory. The memory contains instructions executable by said at least one processor, whereby the node is operative to provide control information to at least one application. The at least one application provides application data to a radio link between the radio device and the wireless communication network. The control information controls providing of the application data by the at least one application to the radio link.

According to a further embodiment of the invention, a computer program or computer program product is provided, e.g., in the form of a non-transitory storage medium, which comprises program code to be executed by at least one processor of a radio device. Execution of the program code causes the radio device to transmit application data via a radio link between the radio device and the wireless communication network. The application data are provided by one or more applications. Further, execution of the program code causes the radio device to receive control information provided by a node of the wireless communication network. Further, execution of the program code causes the radio device to provide the control information to at least one of the applications. The control information controls providing of the application data by the at least one application to the radio link.

According to a further embodiment of the invention, a computer program or computer program product is provided, e.g., in the form of a non-transitory storage medium, which comprises program code to be executed by at least one processor of a node for a wireless communication network. Execution of the program code causes the node to provide control information to at least one application. The at least one application provides application data to a radio link between the radio device and the wireless communication network. The control information controls providing of the application data by the at least one application to the radio link.

Details of such embodiments and further embodiments will be apparent from the following detailed description of embodiments.

DETAILED DESCRIPTION OF EMBODIMENTS

Figure 1:
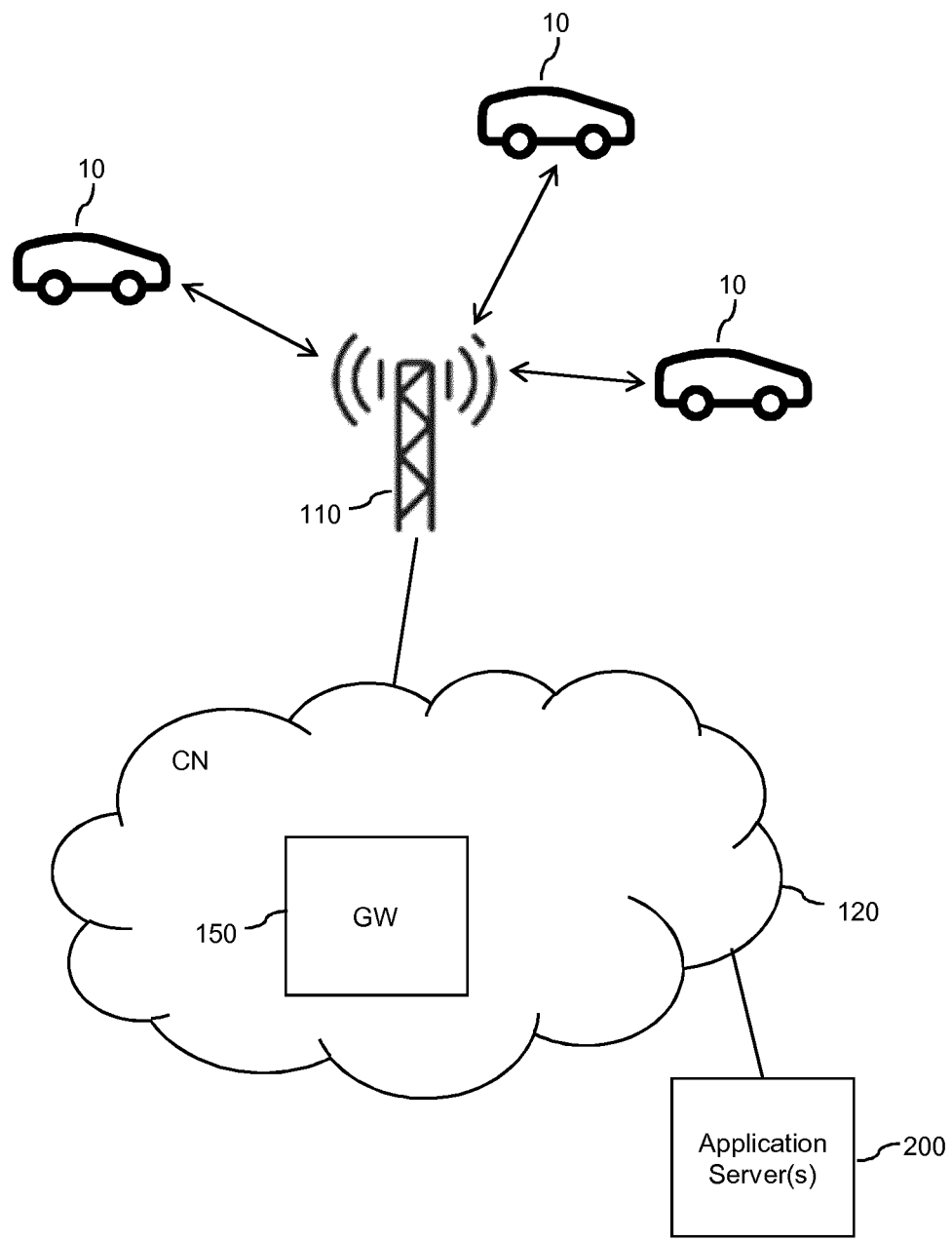
FIG. 1 schematically illustrates an exemplary wireless communication system in which application data traffic may be controlled according to an embodiment of the invention.

In the following, concepts in accordance with exemplary embodiments of the invention will be explained in more detail and with reference to the accompanying drawings. The illustrated embodiments relate to controlling of data traffic between a radio device, in the following also referred to as a UE, and a wireless communication network. The wireless communication network may for example be based on the UMTS (Universal Mobile Telecommunications System) technology, the LTE (Long Term Evolution) technology or the NR (New Radio) technology as specified by 3GPP ($3^{rd}$ Generation Partnership Project). However, it is noted that the illustrated concepts could also be applied to other technologies, e.g., a WLAN (Wireless Local Area Network) technology.

In the illustrated examples, it is assumed that a radio link is established between the radio device and the wireless communication network and that one or more applications provide application data to be transmitted via the radio link. The transfer of the application data may be regarded as being organized in a layered manner, e.g., based on an OSI (Open Systems Interconnection) model protocol stack, including an application layer (layers 5 to 7 of the OSI model) and one or more lower layers. The lower layers may be managed directly or indirectly by the wireless communication network, e.g., using mechanisms like scheduling on a physical layer or flow control on a transport layer. As used herein, an application may be regarded as a software function implemented on the application layer, which may interact with lower layers through one or more APIs (API: "application programming interface").

The one or more applications may be executed on the radio device itself or on one or more other devices, e.g., peripheral devices, linked to the radio device. Further, at least one of the applications could be executed on the radio device, while at least one other application is executed on another devices. For example, the radio device could be a smartphone of a user, and the other device could be a wearable device, e.g., a wristband device, linked to the smartphone. Further, other device could be an infotainment system of a vehicle and the radio device could be a vehicle-mounted or vehicle-integrated communication module, a user's smartphone, a laptop computer, a tablet computer, or an IoT (Internet of Things) device, which is linked to the infotainment system. Further, the other device could correspond to an ECU (Engine Control Unit) or various types of vehicle sensor devices or other components linked to a vehicle bus system, e.g., to a CAN (Controller Area Network) bus. Also in these examples, the radio device may correspond to a vehicle-mounted or vehicle-integrated communication module, a user's smartphone, a laptop computer, a tablet computer, or an IoT device.

In the illustrated examples, it may be utilized that among the application data transmitted via the radio link there may be a significant amount of non-time critical (NTC) application data, such as software updates, log information uploads, sensor data uploads, or pre-configured content downloads. Transfers of such NTC application data may be coordinated in order to better utilize available capacity of the wireless communication network, e.g., by time-shifting to times where usage of the wireless communication network is low. For this purpose, the illustrated examples involve interaction of the mobile communication network and at least one of the applications. A node of the wireless communication network may provide control information to the application, and based on the control information, the application controls the way of providing the application data to the radio link. Accordingly, the control is effected on the application layer, using control information originating from the wireless communication network, e.g., from a RAN (Radio Access Network) part or a CN (Core Network) part of the wireless communication network. In this way, the control information may be based on usage information available in the wireless communication network, such as times and/or areas of the wireless communication network where more capacity is available due to low usage. Using the illustrated concepts, an MNO (Mobile Network Operator) may offer an API which can be used for controlling UL data transfers of application data from the network side. The control may be based on current or expected usage of radio resources. Applications which do not require immediate transfer of the application data may be instructed to suspend an UL data transfer until more resources are available. The MNO itself can control the transfer of the application data by the application(s). In addition or as an alternative, the MNO can offer the control interface as a service to third parties, e.g., parties which are using shared resources of the wireless communication network. When the MNO coordinates the transfers of application data across multiple applications, the MNO may also consider SLA (Service Level Agreement) aspects, e.g., such a guaranteed finalization time of a transfer of application data of a given size.

FIG. 1 illustrates exemplary wireless communication network structures. In particular, FIG. 1 shows multiple UEs 10, which are connected to the wireless communication network by respective radio links (illustrated by double-headed arrows) to an access node 110, e.g., a NB of the UMTS technology, an eNB of the LTE technology, or a gNB of the NR technology. The access node 110 may be regarded as an example of a RAN node. Further, FIG. 1 illustrates a core network (CN) 120 of the wireless communication network. The CN typically includes one or more CN nodes. As an example of a CN node, FIG. 1 illustrates a gateway 150, e.g., an SGSN (Serving General Packet Radio Service Support Node) or GGSN (Gateway General Packet Radio Service Support Node) of the UMTS technology, an SGW (Serving Gateway) or PGW (Packet Data Gateway) of the LTE technology, or a UPF (User Plane Function) of the NR technology.

On the radio links, the access node 110 may send DL (downlink) transmissions to the UEs 10, and the UEs 10 may send UL transmissions to the access node 110. The DL transmissions and UL transmissions may be used to provide various kinds of services to the UEs 10, e.g., a voice service, a multimedia service, or a data service. Such services may be based on applications which are executed on the UE 10 and/or on a device linked to the UE 10. Further, FIG. 1 illustrates one or more application servers 200 provided outside the wireless communication network. The application(s) executed on the UE 10 and/or on one or more other devices linked to the UE 10 may use the radio links to send UL transfers of application data to an application server 200 or to receive DL transfers of application data from an application server 200. However, it is noted that in some scenarios an UL transfer of application data could also be directed to another recipient than an application server 200, e.g., to a peer application hosted on a device of another user. Similarly, in some scenarios a DL transfer of application data could also originate from another source than an application server 200, e.g., from a database, a web server, or a peer application hosted on a device of another user. The UL transfers of application data and the DL transfers of application data may be based on a file transfer mode or on a streaming mode.

In the example of FIG. 1, the UEs 10 are assumed to be vehicles or vehicle-based communication devices, e.g., a vehicle-mounted or vehicle-integrated communication module, or a smartphone or other user device linked to vehicle systems. In such a scenario, the application(s) providing the application data may for example include applications for driver assistance, safety applications, entertainment applications, or the like. The vehicles may be equipped with various sensors, and the application(s) may utilize processing data from the sensors in a cloud system or other remote processing resources. While some sensor data may be time critical, e.g., in view of controlling traffic flows in realtime, other sensor data may be NTC data. An example is an UL transfer of a video clip from a front facing camera of the vehicle. However, it is noted that the illustrated concepts could also be applied to other types of UE, e.g., to smartphones, mobile computers, or machine-type communication devices.

In the following, the control of application data traffic according to the illustrated concepts will be explained in more detail by referring to specific examples illustrated in FIGS. 2, 3, 4, 5, and 6.

Figure 2:
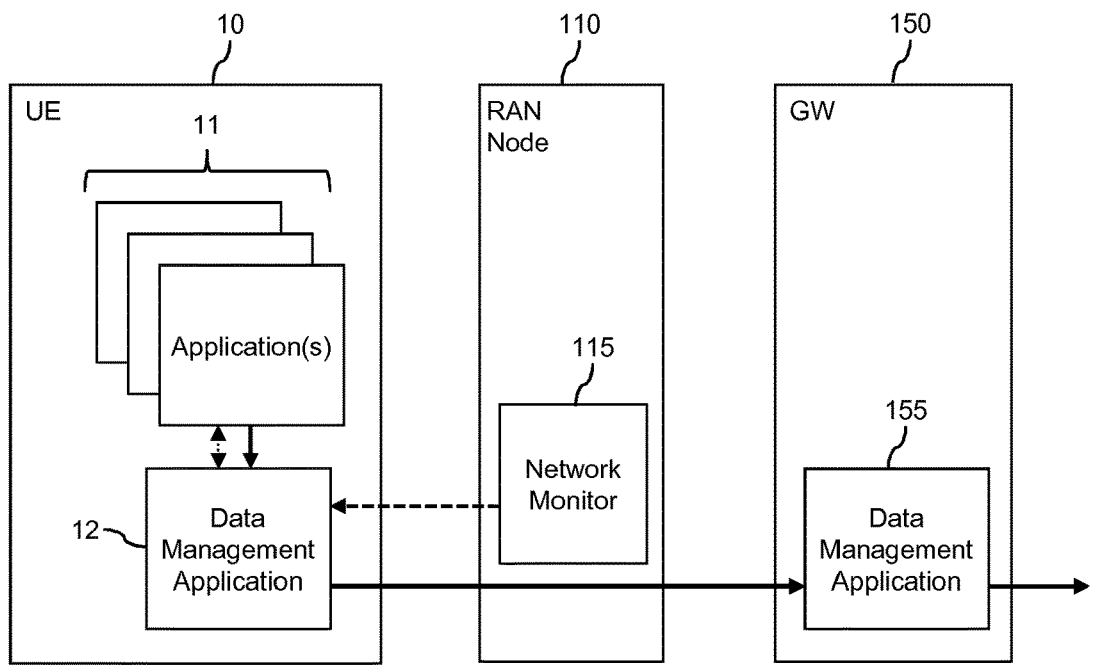
FIG. 2 schematically illustrates an exemplary scenario according to an embodiment of the invention, in which application data traffic is controlled based on control information provided by a radio access network node.

In the example of FIG. 2, the multiple applications 11, 12 are executed on the UE 10. These applications include a data management application 12 and one or more other applications 11. The applications 11, 12, generate application data which is transferred via the radio link to the wireless communication network, and then further to a recipient, e.g., an application server 200. The application 12 performs application data management for the other applications 11, and is therefore referred to as data management application. In a specific example one or more of the applications 11 may also be integrated into the data management application 12. The functionalities of the data management application 12 in particular include collecting of application data originating from the other applications 11, and transferring these application data as part of the data management applications own application data via the radio link. The transfer of the application data is illustrated by solid arrows originating from the applications 11, 12. The transfer of the application data between the other applications 11 and the data management application 12 may be controlled via an API configured between the data management application 12 and the other applications 11 (illustrated by a double-headed dotted arrow between the data management application 12 and the other applications 11).

The application data transferred via the radio link is received by a network-side data management application 155 provided in the gateway (GW) 150. The network-side data management application 155 may collect the received application data and extract the application data of the individual other applications 11 from the received application data. The application data of the other applications 11 can then be forwarded to the intended recipients.

In the example of FIG. 2, the application data are transferred via a RAN node 110, e.g., corresponding to the access node 110 of FIG. 1, to the gateway 150. The RAN node 110 is provided with a network monitor 115 which monitors usage conditions and/or status information of the wireless communication network related to the RAN node, e.g., in terms of available capacity in a service area of the RAN node, utilized or available RATs (radio access technologies), utilized or available frequencies, and/or utilized or available bandwidth. Based on the monitored usage conditions, the network monitor 115 generates control information which is provided to the data management application 12. In addition or as an alternative, the network monitor 115 may generate the control information based on a RAT (radio access technology) used for providing the radio link and/or depending on a location of the UE 10. The control information is illustrated by a dashed arrow originating from the network monitor 115. The control information may be transferred via an API configured between the RAN node 110 and the data management application 12. In some examples, the control information may also include at least a part of the monitored usage conditions and/or status information. In this case, the data management application 12 could evaluate the monitored usage conditions and/or status information and control transfer of the application data to the radio link based on a result of this evaluation.

Figure 3:
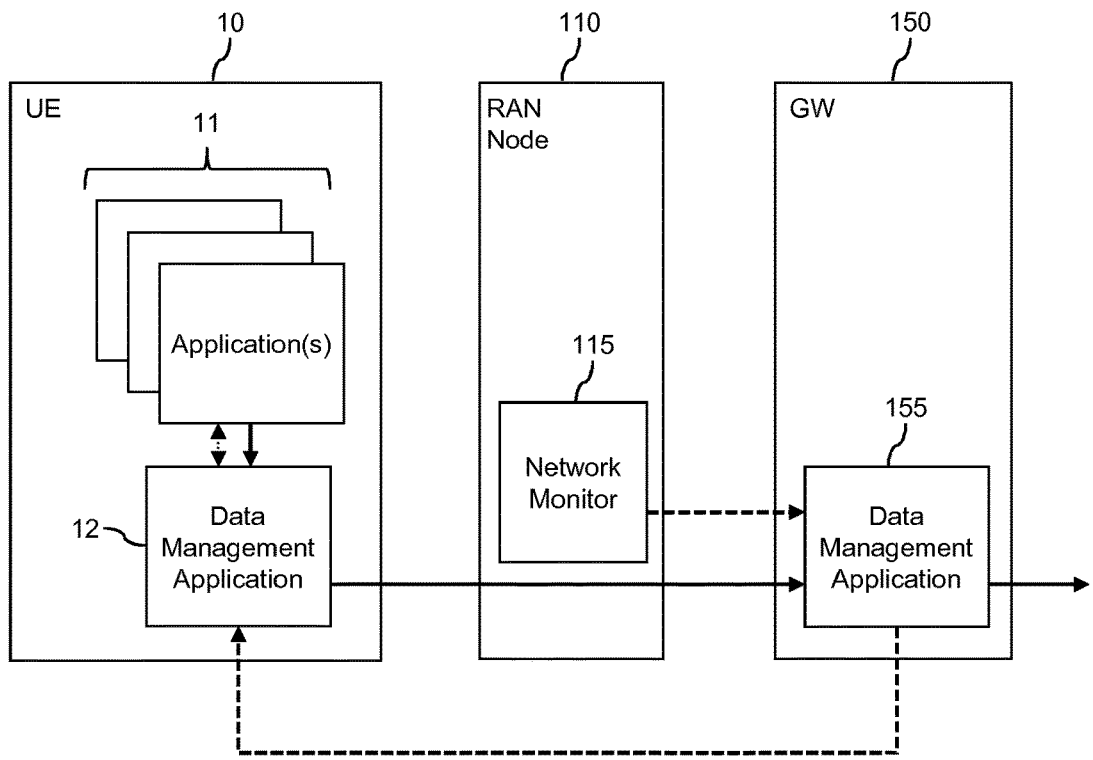
FIG. 3 schematically illustrates an exemplary scenario according to an embodiment of the invention, in which application data traffic is controlled based on control information provided by a core network node.

Also in the example of FIG. 3, the multiple applications 11, 12 are executed on the UE 10. These applications include a data management application 12 and one or more other applications 11. The applications 11, 12, generate application data which is transferred via the radio link to the wireless communication network, and then further to a recipient, e.g., an application server 200. The application 12 performs application data management for the other applications 11, and is therefore referred to as data management application. The functionalities of the data management application 12 in particular include collecting of application data originating from the other applications 11, and transferring these application data as part of the data management applications own application data via the radio link. The transfer of the application data is illustrated by solid arrows originating from the applications 11, 12. The transfer of the application data between the other applications 11 and the data management application 12 may be controlled via an API configured between the data management application 12 and the other applications 11 (illustrated by a double-headed dotted arrow between the data management application 12 and the other applications 11).

The application data transferred via the radio link is received by a network-side data management application 155 provided in the gateway (GW) 150. The network-side data management application 155 may collect the received application data and extract the application data of the individual other applications 11 from the received application data. The application data of the other applications 11 can then be forwarded to the intended recipients.

In the example of FIG. 3, the application data are transferred via a RAN node 110, e.g., corresponding to the access node 110 of FIG. 1, to the gateway 150. The RAN node 110 is provided with a network monitor 115 which monitors usage conditions of the wireless communication network related to the RAN node, e.g., in terms of available capacity in a service area of the RAN node. As illustrated by a dashed arrow originating from the network monitor 115, the network monitor 115 indicates the monitored usage conditions to the network-side data management application in the gateway 150. Based on the indicated usage conditions and/or based on other information available at the gateway 150, e.g., on usage conditions monitored by other RAN nodes, the network-side data management application 155 generates control information which is provided via the to the data management application 12. In addition or as an alternative, the network-side data management application 155 may generate the control information based on a RAT used for providing the radio link and/or depending on a location of the UE 10. The control information is illustrated by a dashed arrow originating from the network-side data management application 155. The control information may be transferred via an API configured between the gateway 150 and the data management application 12. In some examples, the control information may also include at least a part of the monitored usage conditions and/or status information. In this case, the data management application 12 could evaluate the monitored usage conditions and/or status information and control transfer of the application data to the radio link based on a result of this evaluation.

Figure 4:
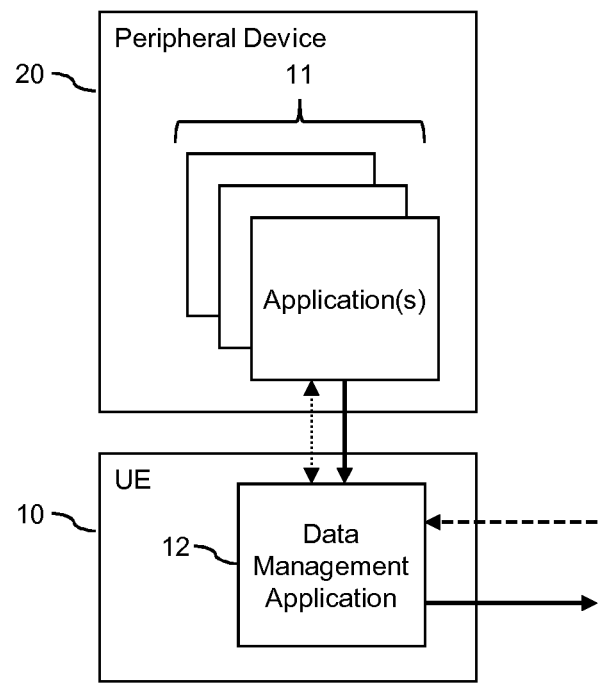
FIG. 4 schematically illustrates an exemplary scenario in which application data provided to a radio link of a radio device originate from applications hosted externally of the radio device.

In the example of FIG. 4, the other applications 11 are hosted by a peripheral device 20 linked to the UE 10. The peripheral device 20 and the UE 10 may be linked by a wireless link, e.g., based on Bluetooth or WLAN, or by a wire-based link, e.g., based on USB (Universal Serial Bus) or Ethernet. Other functionalities may be similar as in the example of FIG. 2 or in the example of FIG. 3.

In the examples of FIGS. 2, 3, and 4, the control information may be used to instruct the data management application 12 to start providing of the application data to the radio link between the UE 10 and the RAN node 110. In addition or as an alternative, the control information may be used to instruct the data management application 12 to stop providing of the application data to the radio link between the UE 10 and the RAN node 110. In addition or as an alternative, the control information may be used to instruct the data management application 12 to pause providing of the application data to the radio link between the UE 10 and the RAN node 110. In this case, the control information can also indicate when to resume providing of the application data, e.g., after a certain time or after moving a certain distance. In addition or as an alternative, the control information may be used to instruct the data management application 12 to trigger establishment of a connection via the radio link by the data management application 12, e.g., by starting a new TCP (Transport Control Protocol) session. In addition or as an alternative, the control information may be used to instruct the data management application 12 to trigger termination of a connection via the radio link by the data management application 12, e.g., by terminating an existing TCP session. In addition or as an alternative, the control information may be used to instruct the data management application 12 to provide the application data of the other applications 11 according to a certain sequence to the radio link between the UE 10 and the RAN node 110. This may also involve prioritizing among the other applications 11. A corresponding priority order may be indicated by the control information.

In the examples of FIGS. 2, 3, and 4, the MNO may configure a RAT usage policy which declines the usage of a certain RAT for a transfer of NTC application data depending on the current location of the UE 10 and/or time. The policy may involve configuring a dedicated capacity for UL transfer of NTC application data traffic. The RAT usage policy may be based on a congestion signal or high usage indication signal. Such signal may indicate to the data management application 12 that the currently used RAT is congested and the data management application 12 should stop sending application data. Alternatively or in addition, the RAT usage policy may be time-of-day based, e.g., involve not allowing or limiting UL transfer of application data during certain time-of-day periods. Another case might be RAT type specific. For example, the wireless communication network may use the NR RAT or some other hot-spot boost capacity to handle specifically UL transfers of NTC application data. The data management application 12 may then be instructed to wait with UL transfer until the UE 10 is in a coverage area offering such hot-spot boost capacity.

Figure 5:
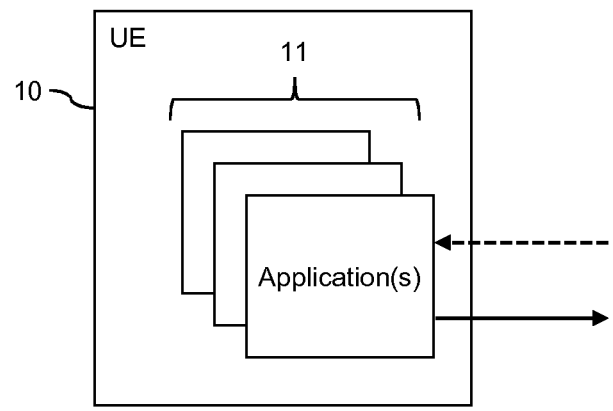
FIG. 5 schematically illustrates a further exemplary scenario in which in which application data traffic is controlled according to an embodiment of the invention.

In the example of FIG. 5, one or more applications 11 hosted by the UE 10 are controlled based on control information provided by a node of the wireless communication network, e.g., by a RAN node like in the example of FIG. 2 or by a CN node like in the example of FIG. 3. Based on the received control information, the applications provide their respective application data to the radio link. In this example, the data management application 12 is not needed in the UE 10. Other functionalities may be similar as in the example of FIG. 2 or in the example of FIG. 3.

In the example of FIG. 5, the control information may be used to instruct the respective application 11 to start providing of the application data to the radio link between the UE 10 and the RAN node 110. In addition or as an alternative, the control information may be used to instruct the respective application 11 to stop providing of the application data to the radio link between the UE 10 and the RAN node 110. In addition or as an alternative, the control information may be used to instruct the respective application 11 to pause providing of the application data to the radio link between the UE 10 and the RAN node 110. In this case, the control information can also indicate when to resume providing of the application data, e.g., after a certain time or after moving a certain distance. In addition or as an alternative, the control information may be used to instruct the respective application 11 to trigger establishment of a connection via the radio link by the application 11, e.g., by starting a new TCP session. In addition or as an alternative, the control information may be used to instruct the respective application 11 to trigger termination of a connection via the radio link by the application 11, e.g., by terminating an existing TCP session.

Also in the example of FIG. 5, the MNO may configure a RAT usage policy which declines the usage of a certain RAT for a transfer of NTC application data depending on the current location of the UE 10 and/or time. The policy may involve configuring a dedicated capacity for UL transfer of NTC application data traffic. The RAT usage policy may be based on a congestion signal or high usage indication signal. Such signal may indicate to the respective application 11 that the currently used RAT is congested and the respective application 11 should stop sending application data. Alternatively or in addition, the RAT usage policy may be time-of-day based, e.g., involve not allowing or limiting UL transfer of application data during certain time-of-day periods. Another case might be RAT type specific. For example, the wireless communication network may use the NR RAT or some other hot-spot boost capacity to handle specifically UL transfers of NTC application data. The respective application 11 may then be instructed to wait with UL transfer until the UE 10 is in a coverage area offering such hot-spot boost capacity.

Figure 6:
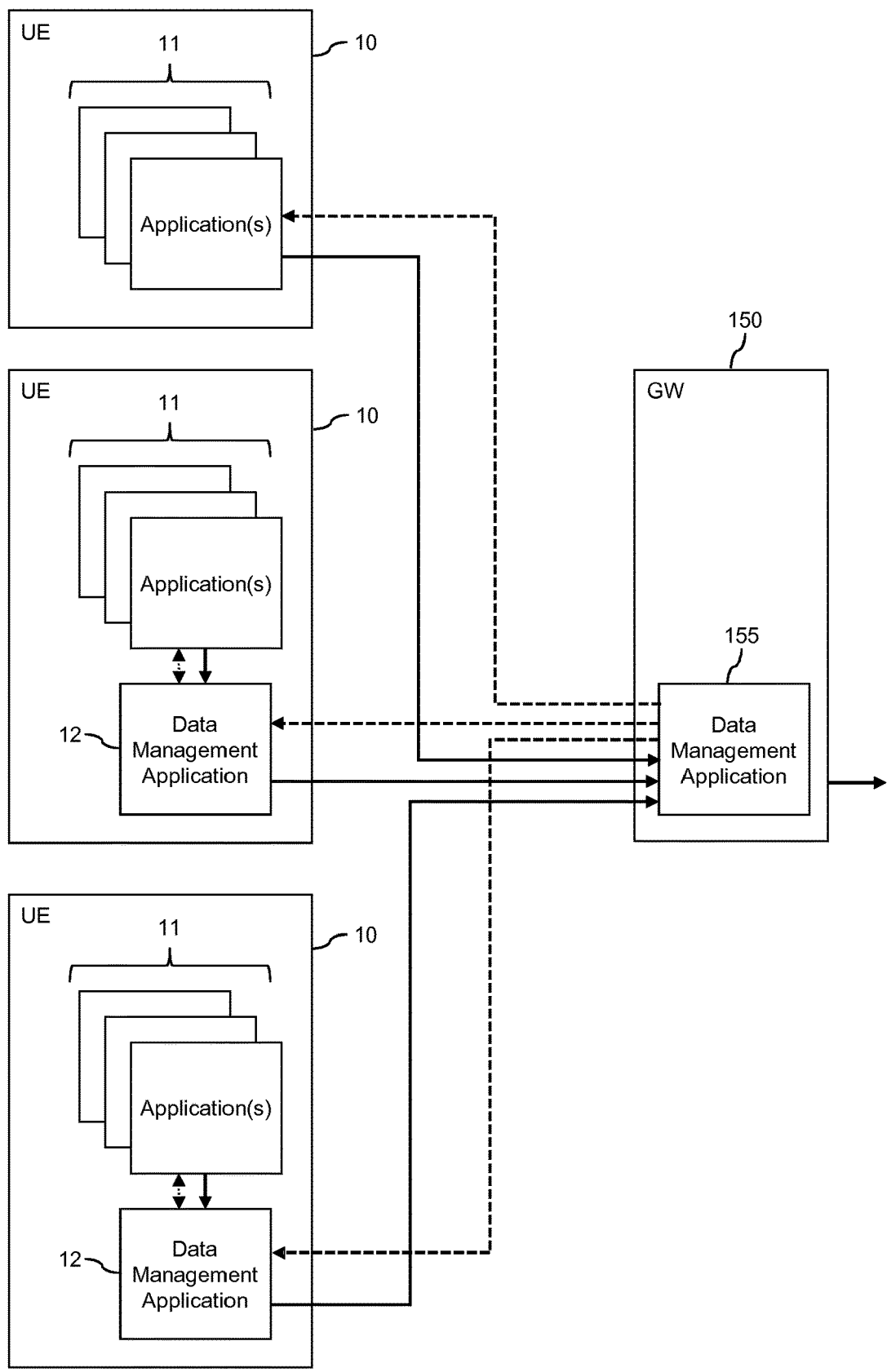
FIG. 6 schematically illustrates a further exemplary scenario in which in which application data traffic of multiple radio devices is controlled according to an embodiment of the invention.

In the example of FIG. 6, one or more applications 11, 12 hosted by different UEs 10 are controlled based on control information provided by a node of the wireless communication network. In the example of FIG. 6, it is however assumed that this node corresponds to the GW 150. It is however noted that similar functionalities could also be implemented by other nodes, e.g., by the RAN node 110. Based on the received control information, the applications 11, 12 provide their respective application data to the radio link between the respective UE 10 and the wireless communication network. In the example of FIG. 6, the network-side data management application 155 may use the control information to prioritize or otherwise coordinate the sending of the application data by the different UEs 10. For example, the network-side data management application 155 could instruct the data management application 12 and/or other application 11 on one of the UEs 10 to stop or pause providing the application data to the respective radio link, while allowing the data management application 12 or other application 11 on another one of the UEs 10 to continue providing the application data to the respective radio link. This may depend on a priority policy configured in the network-side data management application 155. Alternatively or in addition, priority information could also be indicated in the control information and then be used by the data management application 12 or other application 11 on the respective UE 10 to control the process of providing the application data to the radio link, e.g., by stopping or pausing sending the application data if the control information indicates a low priority. Other functionalities may be similar as in the examples of FIG. 2, 3, 4, or 5.

Based on the above principles, an exemplary process of controlling transfer of application data may be as follows: One of the applications 11 needs to transfer a rather large volume of application data to an application server 200. The application data is NTC. The application thus provides the application data to the data management application 12. The UL transfer of the application data may be a file transfer and involve providing the complete file to the data management application 12 before the data management application 12 will start with further transferring the application data. Alternatively, the UL transfer of the application data could also be based on streaming. In this case, segments of the application data may already be transferred from the data management application 12 before the application 11 has provided all segments of the stream to the data management application. The data management application 12 further transfers the application data towards the application server 200, by providing the application data to the radio link between the UE 10 and the wireless communication network. With respect to providing the application data to the radio link, the data management application 12 is controlled by the control information provided from the wireless communication network, e.g., from the RAN node 110 or from the CN node 150. This control may for example involve temporarily suspending the transfer. At a certain point of time, the UL transfer is completely received by the network side data management application 155. This can be indicated by the network-side data management application 155 to the data management application 12. The data management application 12 may then in turn indicate to the application server 200 and/or to some other recipient, that the application data can be retrieved from the network-side data management application 155. If the application server 200 is registered at the network-side data management application 155, the network-side data management application 155 could also notify the application server 200 when the application data are available to be retrieved from the network-side data management application 155, e.g., in the streaming mode, when the first segment of the stream was received at the network-side data management application 155, or in the file transfer mode, when the file was completely received at the network-side data management application 155.

Figure 7:
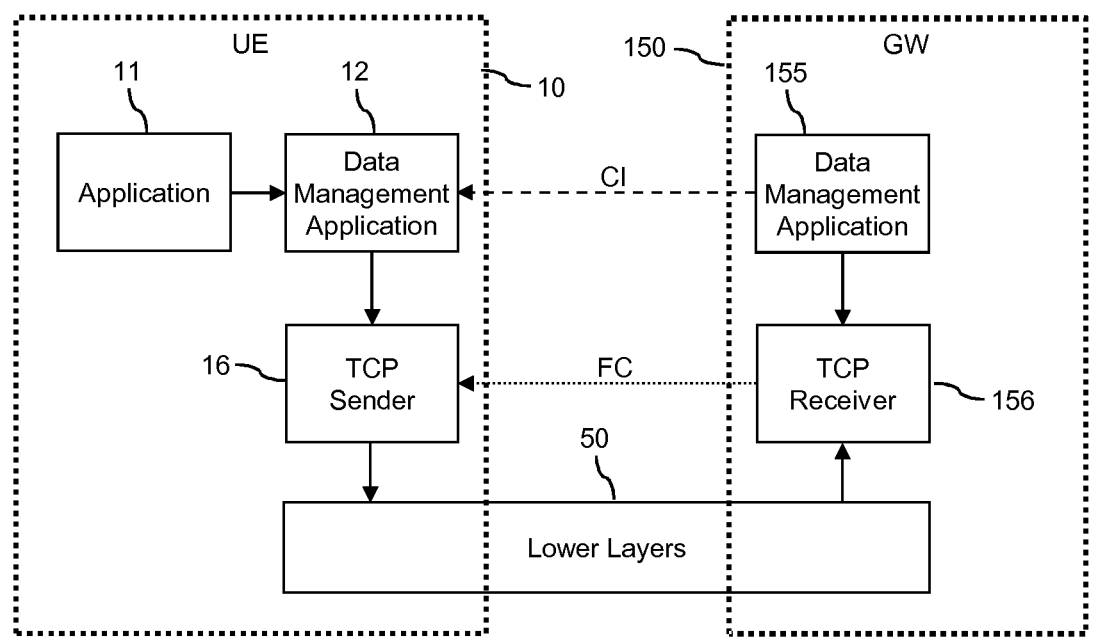
FIG. 7 illustrates cooperation of application-level data management and a lower layer flow control mechanism according to an embodiment of the invention.

FIG. 7 schematically illustrates cooperation of the above-described application layer data management with lower layer mechanisms, in particular transport layer (layer 4 of the OSI model) flow control based on TCP. For the sake of clarity, detailed functionalities of further lower layers 50, e.g., the IP (Internet Protocol) layer, the MAC (Medium Access Control) layer, and PHY (Physical) layer, are not shown in FIG. 7.

In the example of FIG. 7, functionalities of the transport layer include a TCP sender 16 in the UE 10 and a TCP receiver 156 in the gateway 156. The data management application 12 in the UE 10 provides the application data to the TCP sender 16, which sends the application data through the lower layers 50 to the TCP receiver 156. The TCP receiver 156 provides the application data to the network-side data management application 155.

As further illustrated, the TCP receiver 156 may provide a flow control (FC) signal to the TCP sender 16. The flow control signal may be used as a feedback signal of a TCP flow control mechanism. Further, the network-side data management application 155 provides the above-mentioned control information to the data management application 12 in the UE 10.

The TCP flow control mechanism may for example reduce the rate of sending data from the TCP sender 16 in response to the flow control signal indicating a congestion. Further, the TCP flow control mechanism may also be used to indirectly control the way the data management application 12 provides the application data to the TCP sender 16: The network-side data management application 155 may instruct the TCP receiver 156 to set a TCP receive buffer size of the TCP receiver 156 to zero. As a result, the flow control signal will indicate a congestion and the TCP sender 16 stops sending data. However, TCP sender 16 may still send control signal, e.g., a check message at intervals of for example 60s. Completely stopping transmissions on the TCP layer may requires terminating the TCP connection between the TCP sender 16 and the TCP receiver 156. When the TCP connection is terminated, an indication in the application layer control information may be used to instruct the data management application 12 to refrain from establishing a new TCP connection unless the control information instructs the data management application 12 to continue with the transfer of the application data.

Further, the application layer control information may be used to instruct the data management application 12 in the UE 10 to stop or pause providing the application data to the TCP sender 16. As a result, the TCP sender 16 is stops providing data to the lower layers 50, but the TCP sender may still send some keep-alive messages. The application layer control information may also trigger termination of a TCP connection or the start of a new TCP connection by the data management application in the UE 10.

Figure 8:
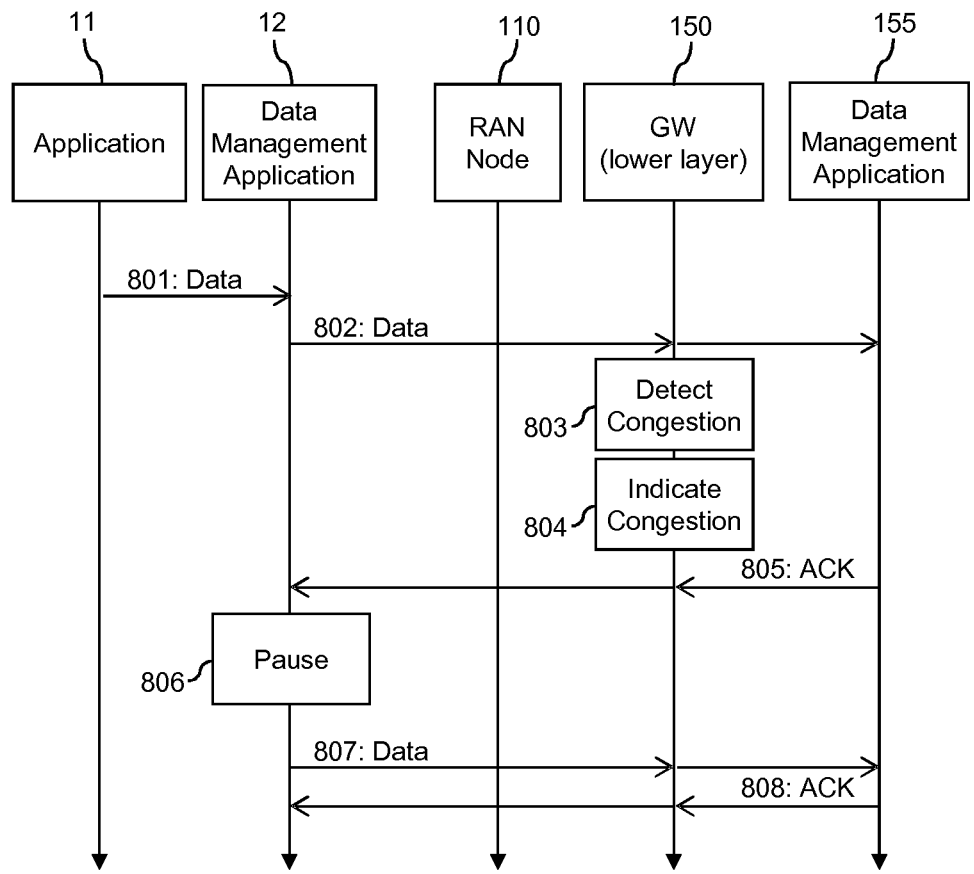
FIG. 8 illustrates exemplary processes according to an embodiment of the invention.

FIG. 8 schematically illustrates an example of processes how the wireless communication network, after detecting a congestion, the wireless communication network may send the control information to instruct the data management application 12 to stop or pause providing the application data to the lower layers. In the example of FIG. 8, it is assumed that detecting and indicating of the congestion is based on the QUIC spin-bit technology (see for example IETF draft "QUIC: A UDP-Based Multiplexed and Secure Transport", 2019 Apr. 25). In this example, lower layers in the gateway (GW) 150 provide a QUIC proxy for processing QUIC frames coming from the UE 10. The detection of the congestion may be based on monitoring round-trip times of application data, e.g., a time interval between sending application data to the recipient and receiving an acknowledgment from the recipient. The monitoring may thus consider both the UL and the DL transmission direction.

As illustrated by 801, the application 11 provides the application data to the data management application 12 in the UE 10. As illustrated by 702, the data management application 12 forwards the application data through the radio link to the network-side data management application 155. In the illustrated example, the transfer of the data 802 is based on QUIC frames. If the gateway 150 detects a congestion, as indicated by block 803, the network-side data management application 155 may indicate the congestion, as indicated by block 804, by utilizing the QUIC proxy to include the control information into QUIC-frames conveyed from the network-side data management application 155 back to the data management application 12 in the UE 10, such as an acknowledgement (ACK) message 805. Accordingly, in response to detecting a congestion the GW 150 can include corresponding information into one or more QUIC-frames passing from the network-side data management application 155 via the GW 150 to the UE 10. In some examples, the GW 150 may also provide such information to the network-side data management application 155, and the network-side data management application 155 may include this information in the QUIC-frame(s). In other examples, the GW 150 itself may include the information into the QUIC-frame(s), without assistance from the network-side data management application 155.

In the example of FIG. 8, the control information may thus indicate that there is a congestion and that the data management application 12 shall pause the providing the application data to the radio link, as indicated by block 806. The pausing of providing the application data may be instructed to be for a certain time period or until the UE 10 has moved into another service area of the wireless communication network. As illustrated by 807 and 808, the data management application 12 may then resume the transfer of the application data.

It is noted that the processes of FIG. 8 are merely exemplary and that similar processes could for example involve that the congestion is detected by the RAN node 110.

As can be seen, the illustrated concepts may be used to enable the MNO to directly control transfers of application data by one or more applications. The MNO may provide software library functions in the UE 10, which may be used by the data management supplication 12 or directly by applications 11 of third party providers. The MNO can start or stop individual UL transfers of application data on usage conditions, e.g., cell load, cell capabilities, or time-of-day. The MNO can also define a sequence the UL transfers of several applications and/or UEs 10 in the same service area.

As explained above, the wireless communication network may include a monitoring function which monitors usage conditions of a certain service area, such as the above-mentioned network monitor 115. Such monitoring function may also check how many flows of application data are currently active in the same service area, i.e., compete for the same resources. The monitoring function can then generate the control information to control the process of providing the application data by the respective application 11, 12. When the monitoring function schedules the available resources sequentially, e.g., by stopping or pausing the transfer, the monitoring function may also consider SLA information with third parties, such as agreed finalization times for a transfer of application data. For example, the monitoring function may decide to continue the transfer of the application data only for that application 11, 12 having the closest estimated finalization time of the UL transfer. As shown in FIGS. 2 and 3, the monitoring function may be implemented in the RAN part of the wireless communication function. In addition or as an alternative, it may be implemented in the CN part, e.g., in a SGW or PGW of the LTE technology or in an UPF of the NR technology.

Figure 9:
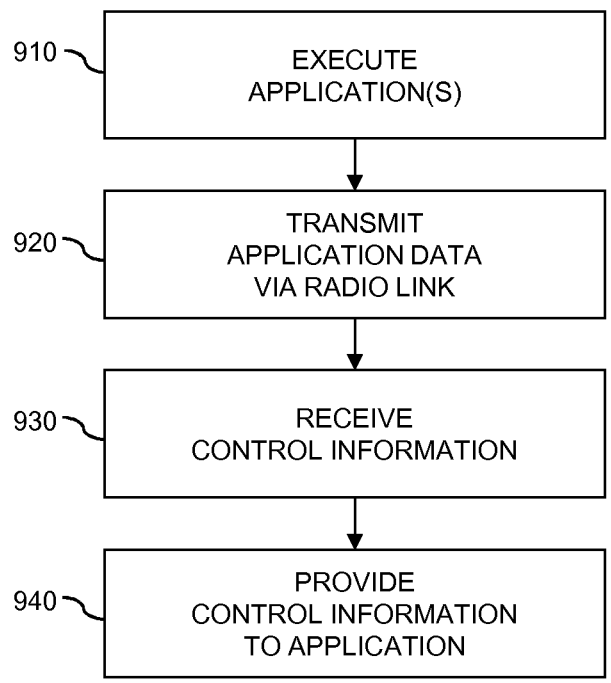
FIG. 9 shows a flowchart for illustrating a method according to an embodiment of the invention.

FIG. 9 shows a flowchart for illustrating a method, which may be utilized for implementing the illustrated concepts. The method of FIG. 9 may be used for implementing the illustrated concepts in a radio device, e.g., corresponding to any of the above-mentioned UEs 10.

If a processor-based implementation of the radio device is used, at least some of the steps of the method of FIG. 9 may be performed and/or controlled by one or more processors of the radio device. Such radio device may also include a memory storing program code for implementing at least some of the below described functionalities or steps of the method of FIG. 9.

At step 910, the radio device may execute one or more applications. In addition or as an alternative, the radio device may receive application data from one or more applications executed on one or more other devices linked to the radio device. Examples of such applications are the above-mentioned applications 11, 12.

At step 920, the radio device transmits application data of the one or more applications via a radio link between the radio device and the wireless communication link. This may specifically involve performing one or more UL transfers of application data.

At step 930, the radio device receives control information from a node of the wireless communication network. The node may be a node of a RAN part of the wireless communication network or a node of a CN part of the wireless communication network. The above-mentioned RAN node 110 and the above-mentioned gateway 150 are examples of such node.

In some scenarios, at least a part of the control information is received in a transfer of application data addressed to the at least one application, e.g., by modifying protocol information like for example explained in the example of FIG. 8.

At step 940, the radio device provides the control information to at least one of the one or more applications. The control information controls providing of the application data by the at least one application to the radio link.

In some scenarios, at least a part of the control information is provided via a an API configured between the application and the node of the wireless communication network. In some cases, the API may be provided across via one or more intermediate nodes.

The control information may control a timing of providing the application data to the radio link. For example, the control information may instruct or otherwise cause the at least one application to start providing the application data to the radio link or to stop providing the application data to the radio link. Further, the control information may instruct or otherwise cause the at least one application to pause providing the application data to the radio link. In this case, the control information can also indicate when the at least one application shall resume providing the application data to the radio link, e.g., after a certain time or after moving a certain distance. The control information may include one or more explicit instructions causing a corresponding control operation of the at least one application. In addition or as an alternative, the control information may include information which implicitly indicates a control operation to be performed by the at least one application, e.g., in terms of an congestion indicator which is interpreted as an instruction to stop or pause providing the application data to the radio link.

In some scenarios, the control information may control establishment of a connection by the at least one application or termination of a connection by the at least one application, e.g., establishment or termination of a TCP connection or other transport layer connection.

In some scenarios, the control information may control a sequence of sending the application data of multiple applications. This may also involve prioritizing among the multiple applications, e.g., by defining which application is allowed first to provide the application data. In some scenarios the control information may also prioritize the sending of the application by the radio device with respect to one or more other radio devices, e.g., as explained in connection with FIG. 6.

In some scenarios, the control information may specify one or more conditions for controlling the providing the application data to the radio link, e.g., in terms of a policy. The one or more conditions may then depend on a location of the radio device and/or a radio technology used for providing the radio link.

In some scenarios, the control information may include a notification that a transfer of the application data was completely received at the wireless communication network.

In some scenarios, the at least one application may notify a recipient of the application data that a transfer of the application data has started or was completely received at the wireless communication network. The recipient may for example correspond to an application server or to a peer application on a remote device. The recipient can then start retrieving the data from a storage provided in the wireless communication network, e.g., as implemented by the above-mentioned network-side data management application 155. In the case of a streaming transfer, the notification can be provided already when the transfer has started, in the case of a file upload transfer, the notification may be provided when the transfer is completely received at the storage in the wireless communication network.

In some scenarios, the at least one application collects application data from one or more further applications and controls the providing of the collected application data to the radio link, e.g., like explained for the above-mentioned data management application 12. The collected application data may in this case be regarded as being part of the application data generated by the at least one application collecting the application data.

The control information may be based on one or more usage conditions in the wireless communication network, e.g., a load, resource utilization, and/or capacity. The usage condition(s) can be monitored or estimated.

Figure 10:
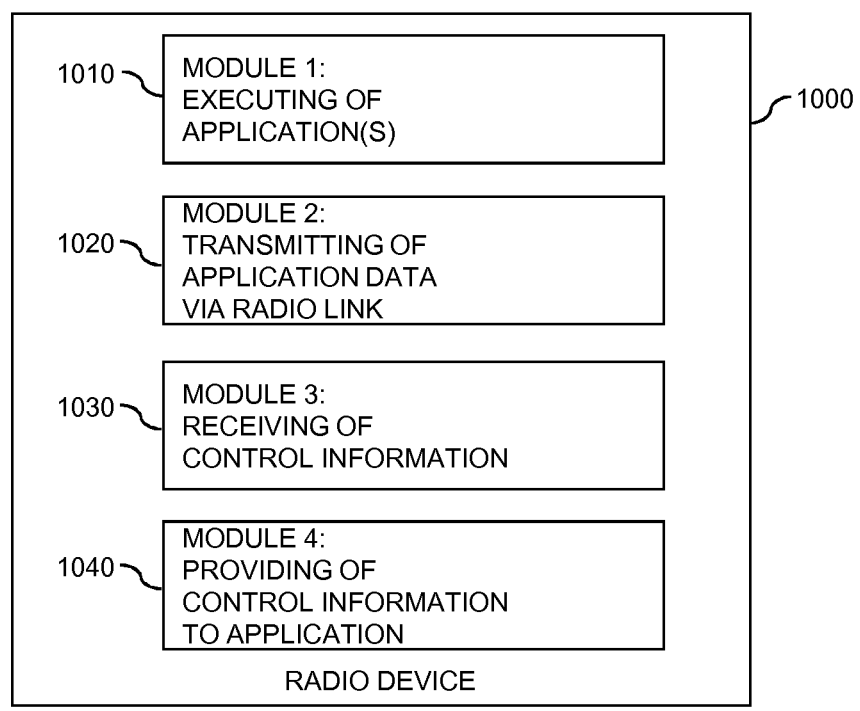
FIG. 10 shows an exemplary block diagram for illustrating functionalities of a radio device implementing functionalities corresponding to the method of FIG. 6.

FIG. 10 shows a block diagram for illustrating functionalities of a radio device 900 which operates according to the method of FIG. 9. The radio device 1000 may for example correspond to any of the above-mentioned UEs 10. As illustrated, the radio device 1000 may optionally be provided with a module 1010 configured to execute one or more applications, such as explained in connection with step 910. Further, the radio device 1000 may be provided with a module 1020 configured to transmit application data via a radio link, such as explained in connection with step 920. Further, the radio device 1000 may be provided with a module 1030 configured to receive control information from a node of the wireless communication network, such as explained in connection with step 930. Further, the radio device 1000 may be provided with a module 1040 configured to provide the control information to at least one application, such as explained in connection with step 940.

It is noted that the radio device 1000 may include further modules for implementing other functionalities, such as known functionalities of a UE. Further, it is noted that the modules of the radio device 1000 do not necessarily represent a hardware structure of the radio device 1000, but may also correspond to functional elements, e.g., implemented by hardware, software, or a combination thereof.

Figure 11:
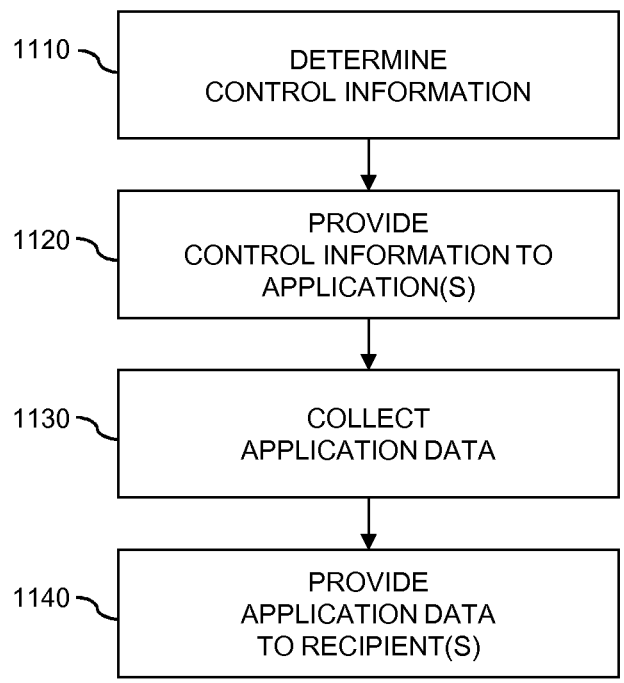
FIG. 11 shows a flowchart for illustrating a further method according to an embodiment of the invention.

FIG. 11 shows a flowchart for illustrating a further method, which may be utilized for implementing the illustrated concepts. The method of FIG. 11 may be used for implementing the illustrated concepts in a node of a wireless communication network, e.g., corresponding to the above-mentioned RAN node 110 or CN node 150.

If a processor-based implementation of the node is used, at least some of the steps of the method of FIG. 11 may be performed and/or controlled by one or more processors of the node. Such node may also include a memory storing program code for implementing at least some of the below described functionalities or steps of the method of FIG. 11.

At step 1110, the node may determine control information. The control information controls providing of application data by at least one application to a radio link between a radio device and the wireless communication network. Examples of such application providing application data to the radio link are the above-mentioned applications 11, 12. The node may determine the control information based on one or more usage conditions in the wireless communication network, e.g., a load, resource utilization, and/or capacity. The usage condition(s) can be monitored or estimated.

The control information may control a timing of providing the application data to the radio link. For example, the control information may instruct or otherwise cause the at least one application to start providing the application data to the radio link or to stop providing the application data to the radio link. Further, the control information may instruct or otherwise cause the at least one application to pause providing the application data to the radio link. In this case, the control information can also indicate when the at least one application shall resume providing the application data to the radio link, e.g., after a certain time or after moving a certain distance. The control information may include one or more explicit instructions causing a corresponding control operation of the at least one application. In addition or as an alternative, the control information may include information which implicitly indicates a control operation to be performed by the at least one application, e.g., in terms of an congestion indicator which is interpreted as an instruction to stop or pause providing the application data to the radio link.

In some scenarios, the control information may control establishment of a connection by the at least one application or termination of a connection by the at least one application, e.g., establishment or termination of a TCP connection or other transport layer connection.

In some scenarios, the control information may control a sequence of sending the application data of multiple applications. This may also involve prioritizing among the multiple applications, e.g., by defining which application is allowed first to provide the application data. In some scenarios the control information may also prioritize the sending of the application by the radio device with respect to one or more other radio devices, e.g., as explained in connection with FIG. 6.

In some scenarios, the control information may specify one or more conditions for controlling the providing the application data to the radio link, e.g., in terms of a policy. The one or more conditions may then depend on a location of the radio device and/or a radio technology used for providing the radio link.

In some scenarios, the control information may include a notification that a transfer of the application data was completely received at the wireless communication network.

In some scenarios, the at least one application may notify a recipient of the application data that a transfer of the application data has started or was completely received at the wireless communication network. The recipient may for example correspond to an application server or to a peer application on a remote device. The recipient can then start retrieving the data from a storage provided in the wireless communication network, e.g., as implemented by the above-mentioned network-side data management application 155. In the case of a streaming transfer, the notification can be provided already when the transfer has started, in the case of a file upload transfer, the notification may be provided when the transfer is completely received at the storage in the wireless communication network.

In some scenarios, the at least one application may collect application data from one or more further applications and controls the providing of the collected application data to the radio link, e.g., like explained for the above-mentioned data management application 12. The collected application data may in this case be regarded as being part of the application data generated by the at least one application collecting the application data.

At step 1120, the node provides the control information to the at least one application. In some scenarios, at least a part of the control information is provided via a an API configured between the node and the at least one application. In some cases, the API may be provided across via one or more intermediate nodes. As an alternative or in addition, the node may provide at least a part of the control information by modifying a transfer of application data addressed to the at least one application, e.g., by modifying protocol information like for example explained in the example of FIG. 8.

At step 1130, the node may collect the application data from the at least one application and at step 1140 the node may forward the application data to one or more recipients, e.g., like explained for the above-mentioned network-side data management application 155.

In some scenarios, the node may notify a recipient of the application data that a transfer of the application data has started or was completely received at the wireless communication network. The recipient may for example correspond to an application server or to a peer application on a remote device. The recipient can then start retrieving the data from a storage provided in the wireless communication network, e.g., as implemented by the above-mentioned network-side data management application 155. In the case of a streaming transfer, the notification can be provided already when the transfer has started, in the case of a file upload transfer, the notification may be provided when the transfer is completely received at the storage in the wireless communication network.

Figure 12:
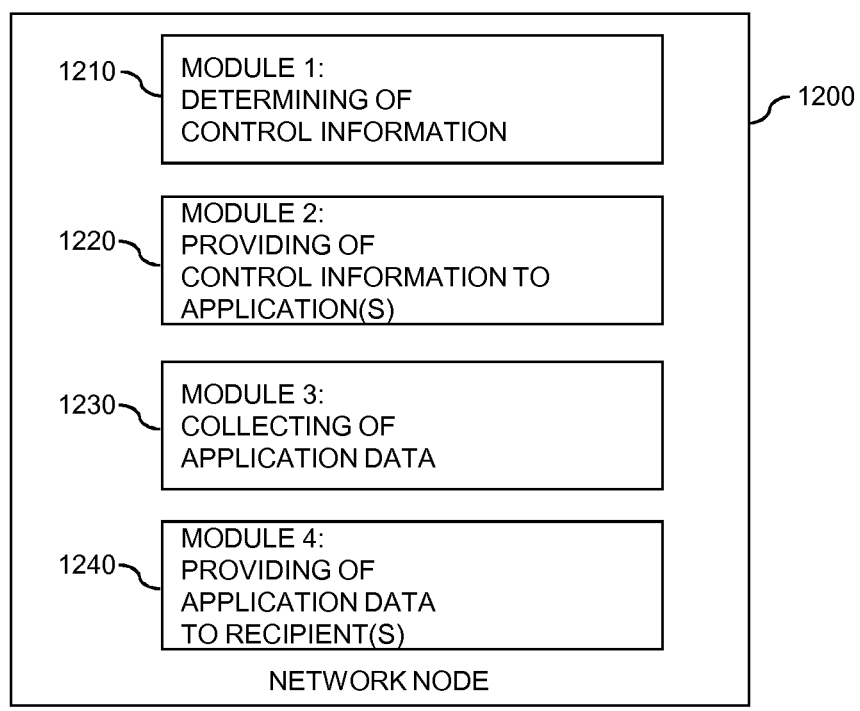
FIG. 12 shows an exemplary block diagram for illustrating functionalities of a network node implementing functionalities corresponding to the method of FIG. 8.

FIG. 12 shows a block diagram for illustrating functionalities of a node 1200 which operates according to the method of FIG. 11. The node 1200 may for example correspond to the above-mentioned RAN node 110 or CN node 150. As illustrated, the node 1200 may optionally be provided with a module 1210 configured to determine control information, such as explained in connection with step 1110. Further, the node 1200 may be provided with a module 1220 configured to provide the control information to at least one application, such as explained in connection with step 1120. Further, the node 1200 may optionally be provided with a module 1230 configured to collect application data, such as explained in connection with step 1130. Further, the node 1200 may optionally be provided with a module 1240 configured to forward the collected application data to one or more recipients, such as explained in connection with step 1140.

It is noted that the node 1200 may include further modules for implementing other functionalities, such as known functionalities of a RAN node or a CN node. Further, it is noted that the modules of the node 1200 do not necessarily represent a hardware structure of the node 1200, but may also correspond to functional elements, e.g., implemented by hardware, software, or a combination thereof.

It is noted that the illustrated concepts could also be implemented in a system including a node operating according to the method of FIG. 11 and one or more of radio devices operating according to the method of FIG. 9. In such system, the node may provide the control information to the one or more radio devices.

Figure 13:
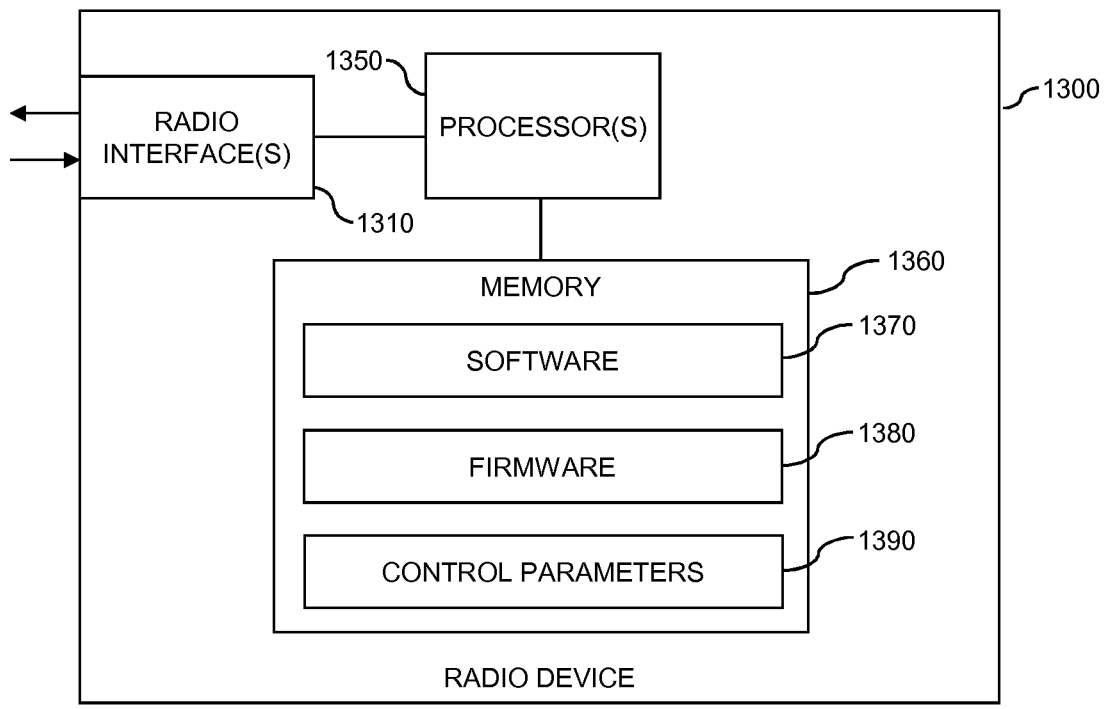
FIG. 13 schematically illustrates structures of a radio device according to an embodiment of the invention.

FIG. 13 illustrates a processor-based implementation of a radio device 1300 which may be used for implementing the above-described concepts. For example, the structures as illustrated in FIG. 13 may be used for implementing the concepts in any of the above-mentioned UEs 10.

As illustrated, the radio device 1300 includes one or more radio interfaces 1310. The radio interface(s) 1310 may for example be based on the UMTS technology, the LTE technology, or the NR technology.

Further, the radio device 1300 may include one or more processors 1350 coupled to the radio interface(s) 1310 and a memory 1360 coupled to the processor(s) 1350. By way of example, the radio interface(s) 1310, the processor(s) 1350, and the memory 1360 could be coupled by one or more internal bus systems of the radio device 1300. The memory 1360 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1360 may include software 1370 and/or firmware 1380. The memory 1360 may include suitably configured program code to be executed by the processor(s) 1350 so as to implement the above-described functionalities for controlling data traffic, such as explained in connection with FIGS. 10 and 11.

It is to be understood that the structures as illustrated in FIG. 13 are merely schematic and that the radio device 1300 may actually include further components which, for the sake of clarity, have not been illustrated, e.g., further interfaces or processors. Also, it is to be understood that the memory 1360 may include further program code for implementing known functionalities of a UE. According to some embodiments, also a computer program may be provided for implementing functionalities of the radio device 1300, e.g., in the form of a physical medium storing the program code and/or other data to be stored in the memory 1360 or by making the program code available for download or by streaming.

Figure 14:
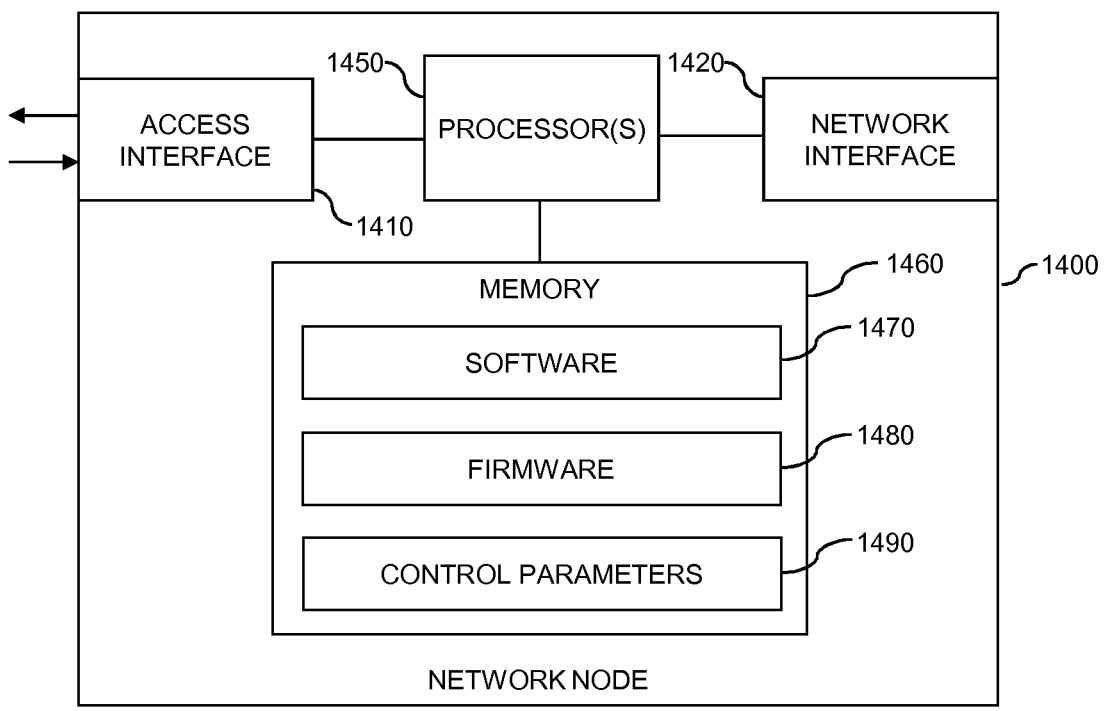
FIG. 14 schematically illustrates structures of a network node according to an embodiment of the invention.

FIG. 14 illustrates a processor-based implementation of a network node 1400 which may be used for implementing the above-described concepts. For example, the structures as illustrated in FIG. 14 may be used for implementing the concepts in the above-mentioned RAN node 110 or CN node 150.

As illustrated, the network node 1400 includes one or more interfaces 1410, 1420. These interfaces may include an access interface 1410 for connecting via a radio link to one or more radio devices, such as the above-mentioned UEs 10. Such radio link may for example be based on the UMTS technology, the LTE technology, or the NR technology. Further, these interfaces may include a network interface 1420 for connecting to one or more other nodes of the wireless communication network.

Further, the network node 1400 may include one or more processors 1450 coupled to the interface(s) 1410, 1420 and a memory 1460 coupled to the processor(s) 1450. By way of example, the interface(s) 1410, the processor(s) 1450, and the memory 1460 could be coupled by one or more internal bus systems of the network node 1300. The memory 1460 may include a ROM, e.g., a flash ROM, a RAM, e.g., a DRAM or SRAM, a mass storage, e.g., a hard disk or solid state disk, or the like. As illustrated, the memory 1360 may include software 1470 and/or firmware 1480. The memory 1460 may include suitably configured program code to be executed by the processor(s) 1450 so as to implement the above-described functionalities for controlling data traffic, such as explained in connection with FIGS. 11 and 12.

It is to be understood that the structures as illustrated in FIG. 14 are merely schematic and that the network node 1400 may actually include further components which, for the sake of clarity, have not been illustrated, e.g., further interfaces or processors. Also, it is to be understood that the memory 1460 may include further program code for implementing known functionalities of a RAN node or CN node. According to some embodiments, also a computer program may be provided for implementing functionalities of the network node 1400, e.g., in the form of a physical medium storing the program code and/or other data to be stored in the memory 1460 or by making the program code available for download or by streaming.

As can be seen, the concepts as described above may be used for efficiently controlling data traffic in a wireless communication network. Specifically, application layer processes of transferring UL data by one or more applications can be controlled from the network side. This can be accomplished individually for certain applications or certain types of application data, without affecting other applications or types of application data. Further, the concepts may enable the network to prioritize among different applications and/or to control the sequencing of application processes, rather than reducing the data rate of all applications.

It is to be understood that the examples and embodiments as explained above are merely illustrative and susceptible to various modifications. For example, the illustrated concepts may be applied in connection with various kinds of radio technologies, without limitation to the UMTS technology, LTE technology, or NR technology. Further, the concepts may be applied with respect to various types of UEs 10, without limitation to vehicle-based UEs. Further, the concepts may be applied with respect to various types of applications hosted by a UE or one ore more devices allowed to utilize the radio link of a UE. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules, e.g. in a cloud system.

In view of the above, the present disclosure provides the following examples:

Example 1

A method of controlling data traffic between a radio device (10; 1000; 1300) and a wireless communication network, the method comprising:

via a radio link between the radio device (10; 1000; 1300) and the wireless communication network, transmitting application data being provided by one or more applications (11, 12); the radio device (10; 1000; 1300) receiving control information provided by a node (110; 150; 1200; 1400) of the wireless communication network; the radio device (10; 1000; 1300) providing the received control information to at least one of the applications (11, 12), wherein the control information controls providing of the application data by the at least one application (11, 12) to the radio link.

Example 2

The method according to example 1,
wherein the control information controls a timing of providing the application data to the radio link.

Example 3

The method according to example 1 or 2,
wherein the control information causes the at least one application (11, 12) to start providing the application data to the radio link.

Example 4

The method according to any one of examples 1 to 3,
wherein the control information causes the at least one application (11, 12) to stop providing the application data to the radio link.

Example 5

The method according to any one of examples 1 to 4,
wherein the control information causes the at least one application (11, 12) to pause providing the application data to the radio link.

Example 6

The method according to any one of examples 1 to 5,
wherein the control information controls establishment of a connection by the at least one application (11, 12).

Example 7

The method according to any one of examples 1 to 6,
wherein the control information controls termination of a connection by the at least one application (11, 12).

Example 8

The method according to any one of examples 1 to 7,
wherein the control information controls a sequence of sending the application data of multiple applications (11, 12).

Example 9

The method according to any one of examples 1 to 8,
wherein the control information controls a priority of sending the application data of at least one of the applications (11, 12).

Example 10

The method according to any one of examples 1 to 9,
wherein the control information specifies one or more conditions for controlling the providing the application data to the radio link.

Example 11

The method according to example 10,
wherein the one or more conditions depend on a location of the radio device (10; 1000; 1300) and/or a radio technology used for providing the radio link.

Example 12

The method according to any one of examples 1 to 11,
wherein the control information comprises a notification that a transfer of the application data was completely received at the wireless communication network.

Example 13

The method according to any one of examples 1 to 12,
wherein the at least one application (11, 12) notifies a recipient (200) of the application data that a transfer of the application data has started or was completely received at the wireless communication network.

Example 14

The method according to any one of examples 1 to 13,
wherein at least a part of the control information is received in a transfer of application data addressed to the at least one application (11, 12).

Example 15

The method according to any one of examples 1 to 14,
wherein at least a part of the control information is provided via a an application programming interface configured between the application and the node (110; 150; 1200; 1400) of the wireless communication network.

Example 16

The method according to any one of examples 1 to 15,
wherein the at least one application (12) collects application data from one or more further applications (11) and controls the providing of the collected application data to the radio link.

Example 17

The method according to any one of examples 1 to 16,
wherein the control information is based on one or more usage conditions in the wireless communication network.

Example 18

A method of controlling data traffic between a radio device (10; 1000; 1300) and a wireless communication network, the method comprising:
a node (110; 150; 1200; 1400) of the wireless communication network providing control information to at least one application (11, 12) providing application data to a radio link between the radio device (10; 1000; 1300) and the wireless communication network,
wherein the control information controls providing of the application data by the at least one application (11, 12) to the radio link.

Example 19

The method according to example 18,
wherein the control information controls a timing of providing the application data to the radio link.

Example 20

The method according to example 18 or 19,
wherein the control information causes the at least one application (11, 12) to start providing the application data to the radio link.

Example 21

The method according to any one of examples 18 to 20, wherein the control information causes the at least one application (11, 12) to stop providing the application data to the radio link.

Example 22

The method according to any one of examples 18 to 21, wherein the control information causes the at least one application (11, 12) to pause providing the application data to the radio link.

Example 23

The method according to any one of examples 18 to 22, wherein the control information controls establishment of a connection by the at least one application (11, 12).

Example 24

The method according to any one of examples 18 to 23, wherein the control information controls termination of a connection by the at least one application (11, 12).

Example 25

The method according to any one of examples 18 to 24, wherein the control information controls a sequence of providing the application data of multiple applications (11, 12).

Example 26

The method according to any one of the examples 18 to 25,
wherein the control information controls a priority of sending the application data of at least one of the applications (11, 12).

Example 27

The method according to any one of examples 18 to 26, wherein the control information specifies one or more conditions for controlling the providing of the application data to the radio link.

Example 28

The method according to example 27,
wherein the one or more conditions depend on a location of the radio device (10; 1000; 1300) and/or on a radio technology used for providing the radio link.

Example 29

The method according to any one of examples 18 to 28, wherein the control information comprises a notification that a transfer of the application data was completely received at the wireless communication network.

Example 30

The method according to any one of examples 18 to 29, wherein the node (110; 150; 1200; 1400) notifies a recipient (200) of the application data that a transfer of the application data has started or was completely received at the wireless communication network.

Example 31

The method according to any one of examples 18 to 30, wherein the node (110; 150; 1200; 1400) provides at least a part of the control information by modifying a transfer of application data addressed to the at least one application (11, 12).

Example 32

The method according to any one of examples 18 to 31, wherein the node (110; 150; 1200; 1400) provides at least a part of the control information via a an application programming interface configured between the node (110; 150; 1200; 1400) and the at least one application (11, 12).

Example 33

The method according to any one of examples 18 to 32, wherein the node (110; 150; 1200; 1400) collects the application data from the at least one application (11, 12) and forwards the application data to one or more recipients (200).

Example 34

The method according to any one of examples 18 to 33, wherein the node (110; 150; 1200; 1400) determines the control information based on one or more usage conditions in the wireless communication network.

Example 35

A radio device (10; 1000; 1300) for operation in a wireless communication network, the
radio device (10; 1000; 1300) being configured to:
via a radio link between the radio device (10; 1000; 1300) and the wireless communication network, transmit application data being provided by one or more applications (11, 12);
receive control information provided by a node (110; 150; 1200; 1400) of the wireless communication network;
provide the control information to at least one of the applications (11, 12), wherein the control information controls providing of the application data by the at least one application (11, 12) to the radio link.

Example 36

The radio device (10; 1000; 1300) according to example 35,
wherein the radio device (10; 1000; 1300) is configured to perform a method according to any one of examples 2 to 15.

Example 37

The radio device (10; 1000; 1300) according to example 35 or 36, comprising:
at least one processor (1350), and
a memory (1360) containing program code executable by the at least one processor (1350), whereby execution of the program code by the at least one processor (1350) causes the radio device (10; 1000; 1300) to perform a method according to any one of examples 1 to 16.

Example 38

The radio device (10; 1000; 1300) according to any one of examples 35 to 37,
wherein the control information controls a timing of providing the application data to the radio link.

Example 39

The radio device (10; 1000; 1300) according to any one of examples 35 to 38,
wherein the control information causes the at least one application (11, 12) to start providing the application data to the radio link.

Example 40

The radio device (10; 1000; 1300) according to any one of examples 35 to 39,
wherein the control information causes the at least one application (11, 12) to stop providing the application data to the radio link.

Example 41

The radio device (10; 1000; 1300) according to any one of examples 35 to 40,
wherein the control information causes the at least one application (11, 12) to pause providing the application data to the radio link.

Example 42

The radio device (10; 1000; 1300) according to any one of examples 35 to 41,
wherein the control information controls establishment of a connection by the at least one application (11, 12).

Example 43

The radio device (10; 1000; 1300) according to any one of examples 35 to 42,
wherein the control information controls termination of a connection by the at least one application (11, 12).

Example 44

The radio device (10; 1000; 1300) according to any one of examples 35 to 43,
wherein the control information controls a sequence of sending the application data of multiple applications (11, 12).

Example 45

The radio device (10; 1000; 1300) according to any one of examples 35 to 44,
wherein the control information controls a priority of sending the application data of at least one of the applications (11, 12).

Example 46

The radio device (10; 1000; 1300) according to any one of examples 35 to 45,
wherein the control information specifies one or more conditions for controlling the providing the application data to the radio link.

Example 47

The radio device (10; 1000; 1300) according to example 46,
wherein the one or more conditions depend on a location of the radio device (10; 1000; 1300) and/or a radio technology used for providing the radio link.

Example 48

The radio device (10; 1000; 1300) according to any one of examples 35 to 47,
wherein the control information comprises a notification that a transfer of the application data was completely received at the wireless communication network.

Example 49

The radio device (10; 1000; 1300) according to any one of examples 35 to 48,
wherein the at least one application (11, 12) notifies a recipient (200) of the application data that a transfer of the application data has started or was completely received at the wireless communication network.

Example 50

The radio device (10; 1000; 1300) according to any one of examples 35 to 49,
wherein at least a part of the control information is received in a transfer of application data addressed to the at least one application (11, 12).

Example 51

The radio device (10; 1000; 1300) according to any one of examples 35 to 50,
wherein at least a part of the control information is provided via a an application programming interface configured between the application and the node (110; 150; 1200; 1400) of the wireless communication network.

Example 52

The radio device (10; 1000; 1300) according to any one of examples 35 to 51,
wherein the at least one application (12) collects application data from one or more further applications (11) and controls the providing of the collected application data to the radio link.

Example 52

The radio device (10; 1000; 1300) according to any one of examples 35 to 51,
wherein the control information is based on one or more usage conditions in the wireless communication network.

Example 53

A node (110; 150; 1200; 1400) for a wireless communication network, the node (110; 150; 1200; 1400) being configured to:

provide control information to at least one application (11, 12) providing application data to a radio link between the radio device and the wireless communication network, wherein the control information controls providing of the application data by the at least one application (11, 12) to the radio link.

Example 54

The node (110; 150; 1200; 1400) according to example 38, wherein the node (110; 150; 1200; 1400) is configured to perform a method according to any one of examples 17 to 31.

Example 55

The node (110; 150; 1200; 1400) according to example 53 or 54, comprising:
 at least one processor (1450), and
 a memory (1460) containing program code executable by the at least one processor (1450), whereby execution of the program code by the at least one processor (1450) causes the radio device (110; 150; 1200; 1400) to perform a method according to any one of examples 17 to 32.

Example 56

The node (110; 150; 1200; 1400) according to any one of examples 53 to 55, wherein the control information controls a timing of providing the application data to the radio link.

Example 57

The node (110; 150; 1200; 1400) according to any one of examples 53 to 56, wherein the control information causes the at least one application (11, 12) to start providing the application data to the radio link.

Example 58

The node (110; 150; 1200; 1400) according to any one of examples 53 to 57, wherein the control information causes the at least one application (11, 12) to stop providing the application data to the radio link.

Example 59

The node (110; 150; 1200; 1400) according to any one of examples 53 to 58, wherein the control information causes the at least one application (11, 12) to pause providing the application data to the radio link.

Example 60

The node (110; 150; 1200; 1400) according to any one of examples 53 to 59, wherein the control information controls establishment of a connection by the at least one application (11, 12).

Example 61

The node (110; 150; 1200; 1400) according to any one of examples 53 to 60, wherein the control information controls termination of a connection by the at least one application (11, 12).

Example 62

The node (110; 150; 1200; 1400) according to any one of examples 53 to 61, wherein the control information controls a sequence of providing the application data of multiple applications (11, 12).

Example 63

The node (110; 150; 1200; 1400) according to any one of the examples 53 to 62, wherein the control information controls a priority of sending the application data of at least one of the applications (11, 12).

Example 64

The node (110; 150; 1200; 1400) according to any one of examples 53 to 63, wherein the control information specifies one or more conditions for controlling the providing of the application data to the radio link.

Example 65

The node (110; 150; 1200; 1400) according to example 64, wherein the one or more conditions depend on a location of the radio device (10; 1000; 1300) and/or on a radio technology used for providing the radio link.

Example 66

The node (110; 150; 1200; 1400) according to any one of examples 53 to 65, wherein the control information comprises a notification that a transfer of the application data was completely received at the wireless communication network.

Example 67

The node (110; 150; 1200; 1400) according to any one of examples 53 to 66, wherein the node (110; 150; 1200; 1400) notifies a recipient (200) of the application data that a transfer of the application data has started or was completely received at the wireless communication network.

Example 68

The node (110; 150; 1200; 1400) according to any one of examples 53 to 67, wherein the node (110; 150; 1200; 1400) provides at least a part of the control information by modifying a transfer of application data addressed to the at least one application (11, 12).

Example 69

The node (110; 150; 1200; 1400) according to any one of examples 53 to 68, wherein the node (110; 150; 1200; 1400) provides at least a part of the control information via a an application programming interface configured between the node (110; 150; 1200; 1400) and the at least one application (11, 12).

Example 70

The node (110; 150; 1200; 1400) according to any one of examples 53 to 69,
wherein the node (110; 150; 1200; 1400) collects the application data from the at least one application (11, 12) and forwards the application data to one or more recipients (200).

Example 71

The node (110; 150; 1200; 1400) according to any one of examples 53 to 70,
wherein the node (110; 150; 1200; 1400) determines the control information based on one or more usage conditions in the wireless communication network.

Example 72

A computer program or computer program product comprising program code to be executed by at least one processor (1350) of a radio device (10; 1000; 1300), whereby execution of the program code causes the radio device (10; 1000; 1300) to perform a method according to any one of examples 1 to 17.

Example 73

A computer program or computer program product comprising program code to be executed by at least one processor (1450) of a node (110; 150; 1200; 1400) for a wireless communication network, whereby execution of the program code causes the node (110; 150; 1200; 1400) to perform a method according to any one of examples 18 to 34.

The invention claimed is:

1. A method of controlling data traffic between a radio device and a wireless communication network, the method comprising:
via a radio link between the radio device and the wireless communication network, transmitting application data being provided by one or more applications;
the radio device receiving control information provided by a node of the wireless communication network;
the radio device providing the received control information to at least one of the applications;
the control information being generated by a network monitor and provided to a data management application and the control information indicating that there is a congestion and that the data management application will pause the providing the application data to the radio link, the control information controlling providing of the application data by the at least one application to the radio link and controlling a priority of sending the application data of at least one of the applications; and
at least a part of the control information being received in a transfer of application data addressed to the at least one application.

2. The method according to claim 1, further comprising:
controlling, based on the control information, a sequence of sending the application data of a plurality of the applications.

3. The method according to claim 1, wherein:
the control information specifies one or more conditions for controlling the providing the application data to the radio link; and
the one or more conditions depend on a location of the radio device and/or a radio technology used for providing the radio link.

4. The method according to claim 1, wherein:
the at least one application collects application data from at least one further application and controls the providing of the collected application data to the radio link.

5. A method of controlling data traffic between a radio device and a wireless communication network, the method comprising:
providing control information by a node of the wireless communication network to at least one application providing application data to a radio link between the radio device and the wireless communication network, the control information being generated by a network monitor and provided to a data management application and the control information indicating that there is a congestion and that the data management application will pause the providing the application data to the radio link, the control information controlling providing of the application data by the at least one application to the radio link and controlling a priority of sending the application data of at least one of the applications; and
at least a part of the control information being received in a transfer of application data addressed to the at least one application.

6. The method according to claim 5, further comprising:
controlling, based on the control information, a sequence of providing the application data of a plurality of the applications.

7. The method according to claim 5, further comprising:
notifying by the node a recipient of the application data that a transfer of the application data has started or was completely received at the wireless communication network.

8. The method according to claim 5, wherein:
determining by the node the control information based on one or more usage conditions in the wireless communication network.

9. A radio device for controlling data traffic between a radio device and a wireless communication network, the radio device comprising:
at least one processor; and a memory containing program code executable by the at least one processor, whereby execution of the program code by the at least one processor causes the radio device to:
via a radio link between the radio device and the wireless communication network, transmit application data being provided by at least one application;
receive control information provided by a node of the wireless communication network, the control information controlling providing of the application data by the at least one application to the radio link and controlling a priority of sending the application data of at least one of the applications;
provide the received control information to at least one of the at least one application, the control information being generated by a network monitor and provided to a data management application and the control information indicating that there is a congestion and that the data management application will pause the providing the application data to the radio link; and at least a part of the control information being received in a transfer of application data addressed to the at least one application.

10. The radio device of claim 9, wherein the execution of the program code by the at least one processor causes the radio device to use the control information to control:
a sequence of sending the application data of a plurality of the applications; or
a priority of sending the application data of the at least one application.

11. The radio device of claim 9, wherein the control information comprises a notification that a transfer of the application data was completely received at the wireless communication network.

12. A node for controlling data traffic between a radio device and a wireless communication network, the node comprising:
at least one processor; and a memory containing program code executable by the at least one processor, whereby execution of the program code by the at least one processor causes the node to:
provide control information to at least one application providing application data to a radio link between the radio device and the wireless communication network, the control information being generated by a network monitor and provided to a data management application and the control information indicating that there is a congestion and that the data management application will pause the providing the application data to the radio link, the control information controlling providing of the application data by the at least one application to the radio link and controlling a priority of sending the application data of at least one of the applications; and
provide at least a part of the control information by modifying a transfer of application data addressed to the at least one application.

13. The node of claim 12, wherein the execution of the program code by the at least one processor causes the radio device to use the control information to control:
a sequence of sending the application data of a plurality of the applications.

14. The node of claim 12, wherein the control information comprises a notification that a transfer of the application data was completely received at the wireless communication network.

15. A computer program product comprising a non-transitory computer readable medium storing program code to be executed by at least one processor of a radio device, whereby execution of the program code causes the radio device to:
via a radio link between the radio device and the wireless communication network, transmit application data being provided by one or more applications;
the radio device receiving control information provided by a node of the wireless communication network, the control information controlling providing of the application data by the at least one application to the radio link and controlling a priority of sending the application data of at least one of the applications;
the radio device providing the received control information to at least one of the applications;
the control information being generated by a network monitor and provided to a data management application and the control information indicating that there is a congestion and that the data management application will pause the providing the application data to the radio link; and
at least a part of the control information being received in a transfer of application data addressed to the at least one application.

16. A computer program product comprising a non-transitory computer readable medium storing program code to be executed by at least one processor of a node for a wireless communication network, whereby execution of the program code causes the node to:
provide control information by a node of the wireless communication network to at least one application providing application data to a radio link between the radio device and the wireless communication network, the control information being generated by a network monitor and provided to a data management application and the control information indicating that there is a congestion and that the data management application will pause the providing the application data to the radio link, the control information controlling providing of the application data by the at least one application to the radio link and controlling a priority of sending the application data of at least one of the applications; and
at least a part of the control information being received in a transfer of application data addressed to the at least one application.

* * * * *